US010384507B2

(12) United States Patent
Kurose et al.

(10) Patent No.: US 10,384,507 B2
(45) Date of Patent: Aug. 20, 2019

(54) SYNTHETIC RESIN-MADE SLIDING BEARING

(71) Applicant: OILES CORPORATION, Tokyo (JP)

(72) Inventors: Kouhei Kurose, Fujisawa (JP); Katsunori Saito, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 15/768,941

(22) PCT Filed: Oct. 31, 2016

(86) PCT No.: PCT/JP2016/082245
§ 371 (c)(1),
(2) Date: Apr. 17, 2018

(87) PCT Pub. No.: WO2017/077974
PCT Pub. Date: May 11, 2017

(65) Prior Publication Data
US 2018/0304714 A1    Oct. 25, 2018

(30) Foreign Application Priority Data

Nov. 2, 2015   (JP) ................................. 2015-216039

(51) Int. Cl.
*B60G 15/06*    (2006.01)
*F16C 33/74*    (2006.01)
(Continued)

(52) U.S. Cl.
CPC ............ *B60G 15/068* (2013.01); *F16C 33/74* (2013.01); *F16F 9/54* (2013.01);
(Continued)

(58) Field of Classification Search
CPC ........ F16C 17/04; F16C 17/045; F16C 33/20; F16C 33/74; F16C 2326/05;
(Continued)

(56) References Cited

U.S. PATENT DOCUMENTS 4,923,312 A      5/1990   Kamimura et al.
5,476,326 A  *  12/1995   Ueno ................... B60G 15/067
                                                          384/125
(Continued)

FOREIGN PATENT DOCUMENTS

CN    1392350 A    1/2003
CN    1492973 A    4/2004
(Continued)

OTHER PUBLICATIONS

International Search Report for PCT/JP2016/082245, dated Jan. 17, 2017, 4 pages.
(Continued)

*Primary Examiner* — Marcus Charles
(74) *Attorney, Agent, or Firm* — Nixon & Vanderhye P.C.

(57) ABSTRACT

A synthetic resin-made sliding bearing 1 includes a synthetic resin-made upper casing 3 having a cylindrical outer peripheral side surface 2; a synthetic resin-made lower casing 6 which has a cylindrical inner peripheral side surface 5 opposed to the outer peripheral side surface 2 on an outer side in a radial direction A so as to surround the outer peripheral side surface 2 with a cylindrical fitting clearance 4 extending in a vertical direction B intersecting the radial direction A, and on which the upper casing 3 is mounted as the upper casing 3 is fitted thereto such that the displacement of the lower casing 6 with respect to the upper casing 3 in the radial direction A is made possible with a width a as a minimum width of the fitting clearance 4 in the radial direction A by being restricted by the contact of the inner peripheral side surface 5 with the outer peripheral side surface 2; and a synthetic resin-made thrust sliding bearing 9 disposed in an annular space 7 between the upper casing 3 and the lower casing 6 in the vertical direction B.

9 Claims, 3 Drawing Sheets

(51) Int. Cl.
  *F16F 9/54* (2006.01)
  *F16C 17/04* (2006.01)
  *F16C 33/20* (2006.01)

(52) U.S. Cl.
  CPC ........ *B60G 2204/418* (2013.01); *F16C 17/04* (2013.01); *F16C 17/045* (2013.01); *F16C 33/20* (2013.01); *F16C 2326/05* (2013.01)

(58) Field of Classification Search
  CPC ...... F16C 2208/20; F16F 9/54; B60G 15/068; B60G 2204/418
  USPC .......................... 384/125, 144, 420; 387/477
  See application file for complete search history.

(56) References Cited

U.S. PATENT DOCUMENTS

| | | | | |
|---|---|---|---|---|
| 6,918,701 B2* | 7/2005 | Ueno | ...................... | F16C 17/10 384/125 |
| 7,407,329 B2* | 8/2008 | Watai | ...................... | F16C 17/04 384/420 |
| 7,993,061 B2* | 8/2011 | Watai | ................... | B60G 15/068 384/420 |
| 8,328,427 B2* | 12/2012 | Kellam | ................ | B60G 15/068 384/144 |
| 9,039,285 B2* | 5/2015 | Morishige | ................ | F16C 33/74 384/420 |
| 2004/0028303 A1 | 2/2004 | Ueno et al. | | |
| 2006/0215944 A1* | 9/2006 | Watai | ...................... | F16C 17/04 384/420 |
| 2008/0310780 A1* | 12/2008 | Watai | ................... | B60G 15/068 384/420 |
| 2009/0180719 A1 | 7/2009 | Miyata et al. | | |

FOREIGN PATENT DOCUMENTS

| | | | | |
|---|---|---|---|---|
| CN | 101438069 A | | 5/2009 | |
| EP | 1 548 303 A1 | | 6/2005 | |
| JP | 2-1532 | | 1/1990 | |
| JP | 2-6263 | | 2/1990 | |
| JP | 4-52488 | | 12/1992 | |
| JP | 8-2500 | | 1/1996 | |
| JP | 09-049529 | | 2/1997 | |
| JP | 09072339 A | * | 3/1997 | .............. F16C 17/04 |
| JP | 2001-027228 | | 1/2001 | |
| JP | 2001-027229 | | 1/2001 | |
| JP | 2009-257516 | | 11/2009 | |
| JP | 2012-097904 | | 5/2012 | |
| WO | WO-2009041052 A1 | * | 4/2009 | ........... B60G 15/063 |
| WO | WO-2010013415 A1 | * | 2/2010 | ........... B60G 15/068 |

OTHER PUBLICATIONS

First Office Action dated Mar. 21, 2019 in Chinese Application No. 201680062971.6, with English translation, 17 pages.
Extended European Search Report dated May 2, 2019 in European Application No. 16862034.2, 7 pages.

* cited by examiner

SYNTHETIC RESIN-MADE SLIDING BEARING

CROSS REFERENCE TO RELATED APPLICATIONS

This application is the U.S. national phase of International Application No. PCT/JP2016/082245 filed 31 Oct. 2016, which designated the U.S. and claims priority to JP Patent Application No. 2015-216039 filed 2 Nov. 2015, the entire contents of each of which are hereby incorporated by reference.

TECHNICAL FIELD

The present invention relates to a synthetic resin-made sliding bearing, and more particularly to a synthetic resin-made sliding bearing which is suitably incorporated as a sliding bearing of a strut-type suspension (Macpherson type) in a four-wheeled motor vehicle.

BACKGROUND ART

In general, among the strut-type suspensions used for front wheels of four-wheeled motor vehicles and having a structure in which a strut assembly incorporating a hydraulic shock absorber in an outer cylinder integrated with a main shaft is combined with a coil spring, there is a type in which when the strut assembly rotates together with the coil spring in the steering operation, the piston rod of the strut assembly rotates, and a type in which the piston rod does not rotate. In the strut-type suspension of either type, there are cases where, a bearing is used between a mounting member on the vehicle body and an upper spring seat of the coil spring, so as to allow smooth rotation of the strut assembly.

In this bearing, a rolling bearing using balls or needles or a synthetic resin-made sliding bearing is used. However, the rolling bearing has a possibility of causing a fatigue failure in the balls or needles owing to such as infinitesimal oscillations and a vibratory load, so that there is a problem in that it is difficult to maintain a smooth steering operation. Meanwhile, the sliding bearing has a high frictional torque as compared to the rolling bearing, and therefore has the possibility of making the steering operation heavy. Furthermore, both bearings have the problem that the steering operation is made heavy due to the high frictional force of a dust seal formed of a rubber elastomer fitted to prevent the ingress of foreign objects such as dust onto sliding surfaces, and the synthetic resin-made sliding bearing in particular has the problem that the steering operation is made much heavier.

PRIOR ART DOCUMENTS

Patent Documents

[Patent Document 1] JP-UM-B-4-52488
[Patent Document 2] JP-UM-B-2-1532
[Patent Document 3] JP-UM-B-2-6263
[Patent Document 4] JP-UM-B-8-2500

SUMMARY OF THE INVENTION

Problems that the Invention is to Solve

To overcome the above-described problems, the present applicant proposed synthetic resin-made thrust sliding bearings which are each comprised of a synthetic resin-made upper casing, a synthetic resin-made lower casing, and a synthetic resin-made thrust sliding bearing interposed between the upper and lower casings, wherein sealing portions based on labyrinth action are formed on the radially inner side and the radially outer side to prevent the ingress of foreign objects such as dust onto the sliding surfaces of the thrust sliding bearing by means of the sealing portions (described in Patent Document 1, Patent Document 2, Patent Document 3, and Patent Document 4).

With these synthetic resin-made sliding bearings, it is possible to overcome the problem of an increase in the steering operating force due to the dust seal which is formed of a rubber elastomer and fitted between the sliding surfaces in such a manner as to surround the sliding surfaces, and it is possible to obtain a stable and smooth steering operating force by preventing as practically as possible the ingress of foreign objects such as dust onto the sliding surfaces.

The sliding bearing including the upper casing, the lower casing, and the thrust sliding bearing interposed an annular space between the upper casing and the lower casing improves sliding characteristics such as low frictional property and wear resistance. However, in a case where a fluctuating load or the like is applied to such a sliding bearing in the radial direction and a displacement occurs to the lower casing in the radial direction, surfaces which form a passage like a labyrinth allowing a space between the upper casing and the lower casing with the thrust sliding bearing disposed therein to communicate with the outside may possibly interfere with (press and contact) each other in the radial direction. As a result, there is a possibility that defects such as deformation, damage, and breakage may occur in these surfaces. Furthermore, in a case where relative sliding in the rotating direction (circumferential direction) occurs in the surfaces where interference has occurred, an increase in the frictional resistance may result, possibly lowering the sliding characteristics.

The present invention has been devised in view of the above-described aspects, and its object is to provide a synthetic resin-made sliding bearing which, even if a fluctuating load or the like is applied to the lower casing in the radial direction and a radial displacement occurs to the lower casing relative to the upper casing, is capable of avoiding interference attributable to the mutual pressing and contacting in the radial direction of those surfaces of the upper casing and the lower casing that define clearances for forming a passage like a labyrinth allowing the annular space between the upper casing and the lower casing with the thrust bearing disposed therein to communicate with the outside, and which does not cause defects such as deformation, damage, and breakage to occur in those surfaces and does not cause a decline in the sliding characteristics attributable to the relative sliding at those surfaces.

Means for Overcoming the Problems

A synthetic resin-made sliding bearing in accordance with the present invention comprises: a synthetic resin-made upper casing having a cylindrical outer peripheral side surface; a synthetic resin-made lower casing which has a cylindrical inner peripheral side surface opposed to the outer peripheral side surface of the upper casing in a radial direction so as to surround the outer peripheral side surface of the upper casing with a cylindrical fitting clearance extending in such a manner as to intersect the radial direction, and on which the upper casing is mounted as the upper casing is fitted thereto such that a radial displacement of the lower casing with respect to the upper casing is made possible with a radial minimum width of the fitting clearance by being restricted by the contact of the inner peripheral side surface with the outer peripheral side surface of the upper casing; and a synthetic resin-made thrust sliding bearing disposed in an annular space between the upper casing and the lower casing in a vertical direction, in an outer peripheral side clearance allowing a radially outer peripheral portion of the annular space to communicate with an outside of the synthetic resin-made sliding bearing and constituted by mutually opposing surfaces of the upper casing and the lower casing and an inner peripheral side clearance allowing a radially inner peripheral portion of the annular space to communicate with the outside of the synthetic resin-made sliding bearing through the fitting clearance and constituted by mutually opposing surfaces of the upper casing and the lower casing, a clearance extending in such a manner as to intersect the radial direction having a radial width which is equal to or greater than the radial minimum width of the fitting clearance.

According to the synthetic resin-made sliding bearing in accordance with the present invention, a clearance extending in such a manner as to intersect the radial direction among clearances allowing the outer peripheral portion of the annular space between the upper casing and the lower casing where the thrust sliding bearing is disposed to communicate with the outside of the synthetic resin-made sliding bearing has a radial width which is equal to or greater than the radial minimum width of the fitting clearance, and a clearance extending in such a manner as to intersect the radial direction among clearances allowing the inner peripheral portion of the annular space between the upper casing and the lower casing where the thrust sliding bearing is disposed to communicate with the outside of the synthetic resin-made sliding bearing similarly has a radial width which is equal to or greater than the radial minimum width of the fitting clearance. Therefore, in the event that a fluctuating load is applied particularly to the lower casing in the radial direction and causes a radial displacement in the lower casing with respect to the upper casing, it is possible to avoid interference attributable to the pressing and contacting in the radial direction between those surfaces of the upper casing and the lower casing that define the respective clearances extending in such a manner as to intersect the radial direction, so that defects such as deformation, damage, and breakage are not caused in those surfaces and a decline is not caused in the sliding characteristics attributable to the relative sliding at those surfaces.

In the synthetic resin-made sliding bearing in accordance with the present invention, the term "outer peripheral side and inner peripheral side clearances" means a clearance constituted by surfaces opposing each other in the radial direction, namely, a clearance extending in such a manner as to intersect the radial direction, and a clearance constituted by surfaces opposing each other in the vertical direction, namely, a clearance extending in the radial direction. In the present invention, the synthetic resin-made sliding bearing may be constituted with an inner peripheral side clearance without being provided with a clearance extending in such a manner as to intersect the radial direction, excluding the fitting clearance.

In the synthetic resin-made sliding bearing in accordance with the present invention, the thrust sliding bearing disposed in the annular space between the upper casing and the lower casing may be formed integrally on one of the upper casing and the lower casing and may have a surface which is in slidable contact with the other one of the upper casing and the lower casing, or alternatively, may be formed separately from the upper casing and the lower casing and may have an upper surface which is in slidable contact with the upper casing and a lower surface which is in slidable contact with the lower casing.

Further, in the synthetic resin-made sliding bearing in accordance with the present invention, at least one of the outer peripheral side clearance and the inner peripheral side clearance may be constituted by a single clearance extending in such a manner as to intersect the radial direction or a plurality of clearances extending in such a manner as to intersect the radial direction so as to form a passage like a labyrinth.

In a preferred example in the synthetic resin-made sliding bearing in accordance with the present invention, the upper casing has a cylindrical upper casing inner suspended portion provided on a radially inner side and having the aforementioned cylindrical outer peripheral side surface, the lower casing has a cylindrical lower casing inner suspended portion provided on the radially inner side and having a cylindrical suspended inner peripheral side surface radially opposing the aforementioned cylindrical outer peripheral side surface, and the inner peripheral side surface of the lower casing includes this suspended inner peripheral side surface, the upper casing being mounted on the lower casing as the upper casing inner suspended portion is fitted to the lower casing inner suspended portion with the fitting clearance between the aforementioned cylindrical outer peripheral side surface and the aforementioned cylindrical suspended inner peripheral side surface in the radial direction.

In a preferred example of the synthetic resin-made sliding bearing in accordance with the present invention in which the upper casing has the upper casing inner suspended portion and the lower casing has the lower casing inner suspended portion, the upper casing has a cylindrical lower end outer suspended portion provided on a radially outer side of a lower end surface of the upper casing inner suspended portion, and the lower casing has an annular lower end plate portion provided on a lower end of the suspended inner peripheral side surface of the lower casing inner suspended portion and a lower end projecting portion provided on an upper surface of the lower end plate portion, the lower end projecting portion at a cylindrical outer peripheral side surface thereof being opposed in the radial direction to a cylindrical inner peripheral side surface of the lower end outer suspended portion with a lower end outer clearance. Further, the lower end outer clearance which forms the inner peripheral side clearance for allowing the radially inner peripheral portion of the annular space to communicate with the outside of the synthetic resin-made sliding bearing and extends in such a manner as to intersect the radial direction has a radial width which is equal to or greater than the radial minimum width of the fitting clearance.

In such a preferred example of the synthetic resin-made sliding bearing in accordance with the present invention, the upper casing may further have a cylindrical lower end inner suspended portion provided on the radially inner side of the lower end surface of the upper casing inner suspended portion so as to form an annular groove in cooperation with the lower end outer suspended portion, and the lower end projecting portion is disposed in the annular groove such that a cylindrical inner peripheral side surface thereof is opposed in the radial direction to a cylindrical outer peripheral side surface of the lower end inner suspended portion with a lower end inner clearance. In this case, the lower end inner clearance which forms the inner peripheral side clearance for allowing the radially inner peripheral portion of the annular space to communicate with the outside of the synthetic resin-made sliding bearing and extends in such a manner as to intersect the radial direction has a radial width which is equal to or greater than the radial minimum width of the fitting clearance.

In another preferred example of the synthetic resin-made sliding bearing in accordance with the present invention in which the upper casing has the upper casing inner suspended portion and the lower casing has the lower casing inner suspended portion, the upper casing has a cylindrical lower end inner suspended portion provided on a radially inner side of the lower end surface of the upper casing inner suspended portion. In this case, the lower casing may have an annular lower end plate portion provided on a lower end of the inner peripheral side surface of the lower casing inner suspended portion, or may have, in addition to such a lower end plate portion, a lower end projecting portion provided on an upper surface of that lower end plate portion. Such a lower end plate portion or lower end projecting portion at a cylindrical inner peripheral side surface thereof is opposed in the radial direction to a cylindrical outer peripheral side surface of the lower end inner suspended portion with a lower end inner clearance. The lower end inner clearance which forms the inner peripheral side clearance for allowing the radially inner peripheral portion of the annular space to communicate with the outside of the synthetic resin-made sliding bearing and extends in such a manner as to intersect the radial direction has a radial width which is equal to or greater than the radial minimum width of the fitting clearance.

In a preferred example of the synthetic resin-made sliding bearing in accordance with the present invention, the upper casing has an annular upper plate portion having a lower surface, and the lower casing has an annular lower plate portion having an upper surface and a cylindrical inner peripheral side surface flush with the cylindrical suspended inner peripheral side surface of the lower casing inner suspended portion, and the inner peripheral side surface of the lower casing includes the inner peripheral side surface of the lower plate portion. Further, the thrust sliding bearing piece has an upper surface which is brought into slidable contact with the lower surface of the upper plate portion and a lower surface which is brought into slidable contact with the upper surface of the lower plate portion, and the annular space is located between the lower surface of the upper plate portion and the upper surface of the lower plate portion.

In a preferred example of the synthetic resin-made sliding bearing in accordance with the present invention which has the upper plate portion and the lower plate portion, the lower casing further has a cylindrical inner projecting portion provided on the radially inner side and having a cylindrical inner peripheral side surface flush with the inner peripheral side surface of the lower plate portion or of a greater diameter than the inner peripheral side surface of the lower plate portion, and the inner peripheral side surface of the lower casing includes the inner peripheral side surface of the inner projecting portion.

In one example of the synthetic resin-made sliding bearing in accordance with the present invention, the upper casing further has a through hole located in a center thereof in the radial direction and an inner peripheral side surface defining the through hole, and the upper casing at the inner peripheral side surface thereof defining the through hole is immovably fixed in the radial direction to a shaft which is passed through the through hole.

In the synthetic resin-made sliding bearing in accordance with the present invention having at least one of the lower end outer clearance and the lower end inner clearance which form the inner peripheral side clearance for allowing the radially inner peripheral portion of the annular space to communicate with the outside of the synthetic resin-made sliding bearing in addition to the outer peripheral side clearance for allowing the radially outer peripheral portion of the annular space to communicate with the outside of the synthetic resin-made sliding bearing, the lower end outer clearance has a radial width which is equal to or greater than the radial minimum width of the fitting clearance, and the lower end inner clearance has a radial width which is equal to or greater than the radial minimum width of the fitting clearance. Therefore, even if a fluctuating load or the like is applied to the lower casing in the radial direction and a radial relative displacement occurs between the upper casing and the lower casing, it is possible to avoid interference attributable to the mutual pressing and contacting in the radial direction between the cylindrical outer peripheral side surface of the lower end projecting portion and the cylindrical inner peripheral side surface of the lower end outer suspended portion for forming the lower end outer clearance, and between the cylindrical outer peripheral side surface of the lower end projecting portion and the cylindrical inner peripheral side surface of the lower end outer suspended portion or between the cylindrical inner peripheral side surface of the lower end projecting portion and the cylindrical outer peripheral side surface of the lower end inner suspended portion for forming the lower end inner clearance, so that defects such as deformation, damage, and breakage are not caused in those side surfaces and a decline is not caused in the sliding characteristics attributable to the relative sliding at those side surfaces.

In another preferred example of the synthetic resin-made sliding bearing in accordance with the present invention, the upper casing includes a cylindrical outer suspended portion provided on a radially outer side and a cylindrical engaging suspended portion having an inner peripheral side surface for forming an annular upper outer groove in cooperation with an outer peripheral side surface of the outer suspended portion and provided radially outwardly of the outer suspended portion, and the lower casing includes a cylindrical outer projecting portion provided on the radially outer side and a cylindrical engaging projecting portion having an inner peripheral side surface for forming an annular lower outer groove in cooperation with an outer peripheral side surface of the outer projecting portion and provided radially outwardly of the outer projecting portion. The outer suspended portion is disposed in the lower outer groove with a radial first clearance between an inner peripheral side surface thereof and the outer peripheral side surface of the outer projecting portion which are opposed to each other in the radial direction and with a radial second clearance between the outer peripheral side surface thereof and an inner peripheral side surface of the engaging projecting portion which are opposed to each other in the radial direction, and the engaging projecting portion is disposed in the upper outer groove with a radial third clearance between an outer peripheral side surface thereof and the inner peripheral side surface of the engaging suspended portion which are opposed to each other in the radial direction. Each of the first to third clearances forming the outer peripheral side clearance allowing the radially outer peripheral portion of the annular space to communicate with the outside of the synthetic resin-made sliding bearing and extending in such a manner as to intersect the radial direction has the radial width which is equal to or greater than the radial minimum width of the fitting clearance. In the case where the lower casing has the outer projecting portion and the inner projecting portion, it suffices if the thrust sliding bearing is disposed in the fitting clearance between the outer projecting portion and the inner projecting portion.

In the above-described synthetic resin-made sliding bearing in accordance with the present invention, if, in the outer peripheral side clearance allowing the radially outer peripheral portion of the annular space to communicate with the outside of the synthetic resin-made sliding bearing and constituted by mutually opposing surfaces of the upper casing and the lower casing and the inner peripheral side clearance allowing the radially inner peripheral portion of the annular space to communicate with the outside of the synthetic resin-made sliding bearing through the fitting clearance and constituted by mutually opposing surfaces of the upper casing and the lower casing, a clearance extending in such a manner as to intersect the radial direction has a radial width which is equal to or greater than the radial minimum width of the fitting clearance, it is possible to avoid interference attributable to the pressing and contacting in the radial direction between those surfaces of the upper casing and the lower casing that define the respective clearances extending in such a manner as to intersect the radial direction, so that defects such as deformation, damage, and breakage are not caused in those surfaces and a decline is not caused in the sliding characteristics attributable to the relative sliding at those surfaces. However, if the width of such a clearance extending in the intersecting manner is excessively large, the ingress of foreign objects such as dust onto the sliding surfaces of that thrust sliding bearing is facilitated, and therefore there is a possibility that it becomes impossible to obtain smooth steering operating force, with the result that it suffices if the maximum width of such a clearance extending in the intersecting manner is determined by taking into consideration a balance between the avoidance of interference and the prevention of ingress of foreign objects.

In the above-described synthetic resin-made sliding bearing, in the case where a plurality of clearances extending in such a manner as to intersect the radial direction are provided so as to form a passage like a labyrinth on the outer peripheral side, and a plurality of clearances extending in such a manner as to intersect the radial direction are provided so as to form a passage like a labyrinth on the inner peripheral side, it is possible to effectively prevent the ingress of foreign objects such as dust from outside the synthetic resin-made sliding bearing into the annular space between the upper casing and the lower casing where the thrust sliding bearing is disposed.

Advantages of the Invention

According to the present invention, it is possible to provide a synthetic resin-made sliding bearing which, even if a fluctuating load or the like is applied to the lower casing in the radial direction and a radial displacement occurs to the lower casing relative to the upper casing, is capable of avoiding interference attributable to the mutual pressing and contacting in the radial direction of those surfaces of the upper casing and the lower casing that define clearances for forming a passage like a labyrinth allowing the annular space between the upper casing and the lower casing with the thrust bearing disposed therein to communicate with the outside, and which does not cause defects such as deformation, damage, and breakage to occur in those surfaces and does not cause a decline in the sliding characteristics attributable to the relative sliding at those surfaces.

MODE FOR CARRYING OUT THE INVENTION

Figure 1:
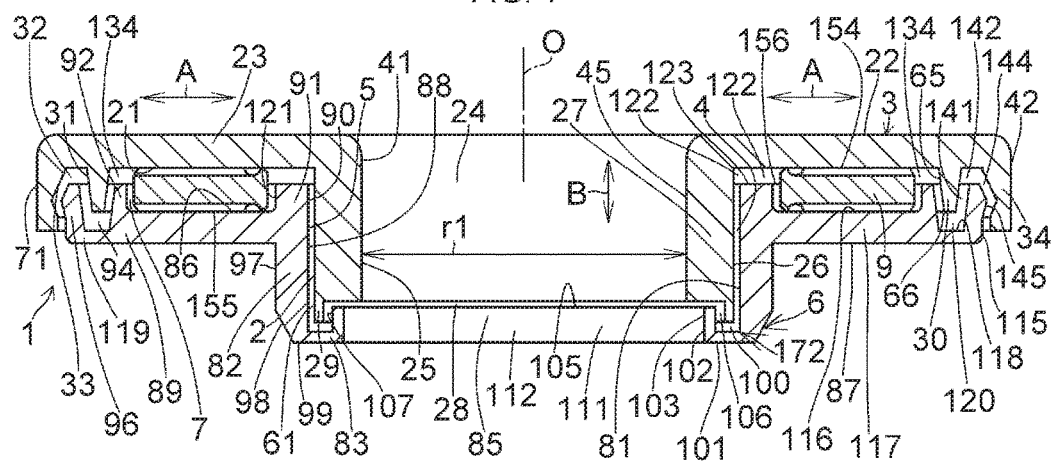
FIG. 1 is an explanatory cross-sectional view of a preferred embodiment of the invention.
Figure 2:
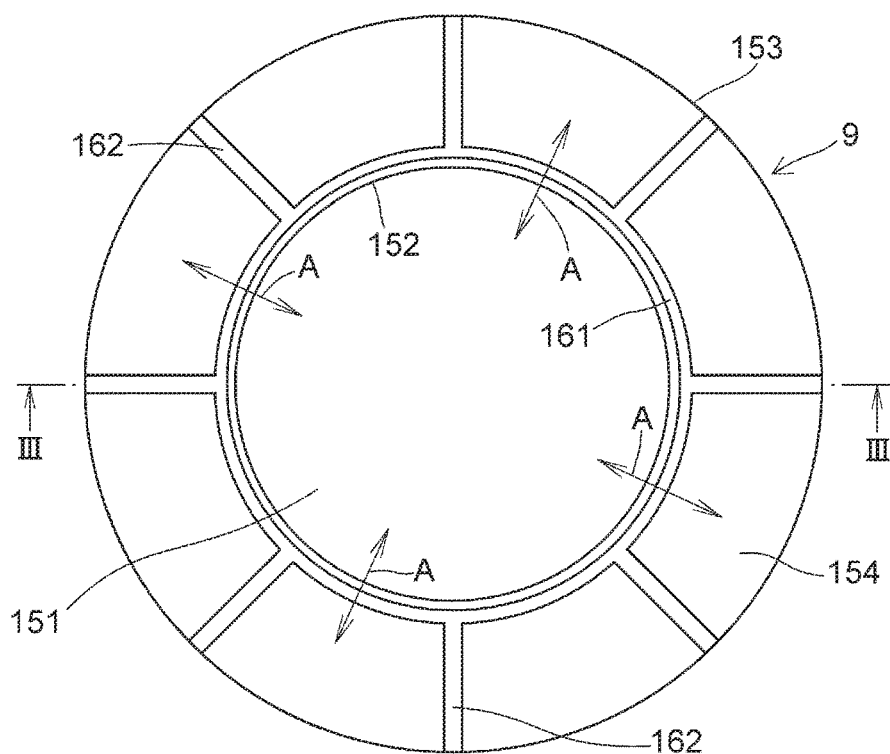
FIG. 2 is an explanatory plane view of a thrust sliding bearing in the embodiment shown in FIG. 1.
Figure 3:
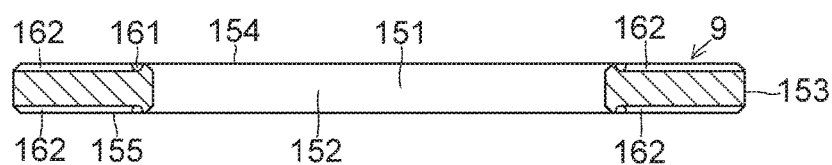
FIG. 3 is an explanatory cross-sectional view, taken in the direction of arrows along line III-III shown in FIG. 2, of the thrust sliding bearing in the embodiment shown in FIG. 1.
Figure 4:
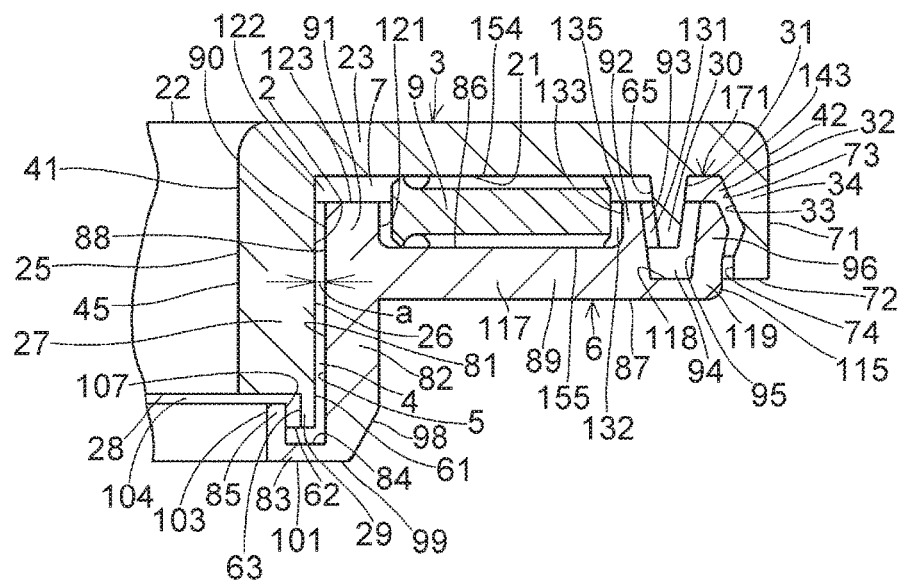
FIG. 4 is an explanatory partially enlarged cross-sectional view of the embodiment shown in FIG. 1.

Hereafter, a detailed description will be given of the mode for carrying out the invention with reference to the preferred embodiments illustrated in the drawings. It should be noted that the present invention is not limited to these embodiments.

In FIGS. 1 to 4, a synthetic resin-made sliding bearing 1 in accordance with this embodiment is comprised of a synthetic resin-made upper casing 3 having a cylindrical outer peripheral side surface 2; a synthetic resin-made lower casing 6 which has a cylindrical inner peripheral side surface 5 opposed to the outer peripheral side surface 2 on an outer side in a radial direction A so as to surround the outer peripheral side surface 2 with a cylindrical fitting clearance 4 extending in a vertical direction B intersecting the radial direction A, and on which the upper casing 3 is mounted as the upper casing 3 is fitted thereto such that the displacement of the lower casing 6 with respect to the upper casing 3 in the radial direction A is made possible with a width a as a minimum width of the fitting clearance 4 in the radial direction A by being restricted by the contact of the inner peripheral side surface 5 with the outer peripheral side surface 2; and a synthetic resin-made thrust sliding bearing 9 disposed in an annular space 7 between the upper casing 3 and the lower casing 6 in the vertical direction B.

The upper casing 3 includes an annular upper plate portion 23 having a lower surface 21 and an upper surface 22; a through hole 24 located in a center in the radial direction A and having diameter r1; an inner peripheral side surface 25 defining the through hole 24; a cylindrical upper casing inner suspended portion 27 provided on the inner side in the radial direction A and having a cylindrical suspended outer peripheral side surface 26; a cylindrical lower end outer suspended portion 29 provided integrally on an annular lower end surface 28 of the upper casing inner suspended portion 27 on the outer side in the radial direction A of the lower end surface 28; a cylindrical outer suspended portion 30 provided on the outer side in the radial direction A; and a cylindrical engaging suspended portion 34 which has an inner peripheral side surface 33 for forming an annular upper outer groove 32 in cooperation with the lower surface 21 and an outer peripheral side surface 31 of the outer suspended portion 30 and is provided outwardly in the radial direction A of the outer suspended portion 30.

The upper plate portion 23 has a cylindrical inner peripheral side surface 41 and a cylindrical outer peripheral side surface 42 in addition to the lower surface 21 and the upper surface 22.

The upper casing inner suspended portion 27 has a cylindrical inner peripheral side surface 45 which is provided integrally on the lower surface 21 on the inner side in the radial direction A of the lower surface 21 and is continuously connected to the inner peripheral side surface 41 in such a manner as to be flush with the inner peripheral side surface 41. The inner peripheral side surface 25 defining the through hole 24 is constituted by the inner peripheral side surface 41 and the inner peripheral side surface 45.

The lower end outer suspended portion 29 has a cylindrical outer peripheral side surface 61 connected continuously to the suspended outer peripheral side surface 26 in such a manner as to be flush therewith, an annular lower end surface 62 connected continuously to the outer peripheral side surface 61, and an annular inner peripheral side surface 63 connected continuously to the lower end surface 62 and the lower end surface 28.

Thus, the outer peripheral side surface 2 has the suspended outer peripheral side surface 26 and the outer peripheral side surface 61.

The outer suspended portion 30 is provided integrally on the lower surface 21 on the outer side in the radial direction A of the lower surface 21 in such a manner as to be spaced apart from the upper casing inner suspended portion 27 outwardly in the radial direction A, and has an annular lower surface 66 and a truncated conical surface-shaped inner peripheral side surface 65 in addition to the truncated conical surface-shaped outer peripheral side surface 31.

The engaging suspended portion 34, which is integrally provided on the lower surface 21 on the outermost side in the radial direction A of the lower surface 21 in such a manner as to be spaced apart from the outer suspended portion 30 outwardly in the radial direction A, has, in addition to the inner peripheral side surface 33, a cylindrical outer peripheral side surface 71 connected continuously to the outer peripheral side surface 42 in such a manner as to be flush with the outer peripheral side surface 42 and an annular lower surface 72. The inner peripheral side surface 33 has a truncated conical surface 73 connected continuously to the lower surface 21 and a tubular inwardly bulged engaging surface 74 connected continuously to the truncated conical surface 73 and bulging inwardly in the radial direction A.

The lower casing 6 includes a cylindrical lower casing inner suspended portion 82 having a cylindrical suspended inner peripheral side surface 81 provided on the inner side in the radial direction A and opposed to the outer peripheral side surface 2 in the radial direction A; an annular lower end plate portion 83 provided integrally on a lower end of the suspended inner peripheral side surface 81 by a cylindrical inner peripheral side surface; a cylindrical lower end projecting portion 85 provided integrally on an annular upper surface 84 of the lower end plate portion 83; an annular lower plate portion 89 having, in addition to an upper surface 86 and an annular lower surface 87, a cylindrical inner peripheral side surface 88 connected continuously to the suspended inner peripheral side surface 81 in such a manner as to be flush with the suspended inner peripheral side surface 81; a cylindrical inner projecting portion 91 which is provided on the inner side in the radial direction A and has a cylindrical inner peripheral side surface 90 connected continuously to the inner peripheral side surface 88 in such a manner as to be flush with the inner peripheral side surface 88; a cylindrical outer projecting portion 92 provided on the outer side in the radial direction A; and a cylindrical engaging projecting portion 96 having a truncated conical surface-shaped inner peripheral side surface 95 for forming an annular lower outer groove 94 in cooperation with the upper surface 86 and a truncated conical surface-shaped outer peripheral side surface 93 of the outer projecting portion 92 and provided radially outwardly of the outer projecting portion 92.

In addition to the suspended inner peripheral side surface 81, the lower casing inner suspended portion 82 has a cylindrical suspended outer peripheral side surface 97 connected continuously to the lower surface 87, a truncated conical surface-shaped outer peripheral side surface 98 connected continuously to the suspended outer peripheral side surface 97, and an annular lower end surface 99 connected continuously to the truncated conical surface-shaped outer peripheral side surface 98. This lower casing inner suspended portion 82 is provided integrally on the lower surface 87 on the innermost side in the radial direction A of the lower surface 87. In addition to the upper surface 84 opposed to the lower end surface 62 with an annular clearance 100 therebetween in the vertical direction B, the lower end plate portion 83 has an annular lower surface 101 connected continuously to the lower end surface 99 in such a manner as to be flush with the lower end surface 99 and a cylindrical inner peripheral side surface 102 connected continuously to the lower surface 101. The lower end projecting portion 85 includes a cylindrical inner peripheral side surface 103 connected continuously to the inner peripheral side surface 102 in such a manner as to be flush with the inner peripheral side surface 102; an annular upper end surface 105 connected continuously to the inner peripheral side surface 103 and opposed to the lower end surface 28 with an annular clearance 104 therebetween in the vertical direction B; and a cylindrical outer peripheral side surface 107 connected continuously to the upper end surface 105 and opposed to the inner peripheral side surface 63 with a lower end outer clearance 106 therebetween in the radial direction A.

A cylindrical inner peripheral side surface 111 which is constituted by the inner peripheral side surface 102 and the inner peripheral side surface 103 defines a through hole 112 which communicates with the through hole 24 and has a diameter ($\gg r1+2a$) which sufficiently exceeds a value obtained by adding the double of the width a to the diameter r1

In addition to the upper surface 86, the lower surface 87, and the inner peripheral side surface 88, the lower plate portion 89 includes a cylindrical outer peripheral side surface 115 larger in diameter than the inner peripheral side surface 88, and further includes an inner disk-like portion 117 having the inner peripheral side surface 88 and an upper surface 116, and an outer disk-like portion 119 formed integrally on the cylindrical outer peripheral side surface of the inner disk-like portion 117 and having the outer peripheral side surface 115 and an upper surface 118. The inner disk-like portion 117 has a thickness greater than the thickness of the outer disk-like portion 119 in the vertical direction B. Thus, the upper surface 86 is constituted by the annular upper surface 116 with the inner projecting portion 91 and the outer projecting portion 92 formed integrally therewith and by the annular upper surface 118 with the engaging projection 96 formed integrally therewith. The lower outer groove 94 is formed by the outer peripheral side surface 93, the inner peripheral side surface 95, and the upper surface 118 of the upper surface 86, and the upper surface 118 forms an annular clearance 120 in cooperation with the lower surface 66 opposing the same in the vertical direction B.

In addition to the inner peripheral side surface 90, the inner projecting portion 91 includes a cylindrical outer peripheral side surface 121 and an annular upper end surface 123 connected continuously to the inner peripheral side surface 90 and the outer peripheral side surface 121 and opposed to the lower surface 21 in the vertical direction B with an annular clearance 122 therebetween.

Thus, the inner peripheral side surface 5 opposed to the outer peripheral side surface 2 on the outer side in the radial direction A with the fitting clearance 4 of the width a includes the suspended inner peripheral side surface 81, the inner peripheral side surface 88, and the inner peripheral side surface 90.

In addition to the outer peripheral side surface 93 opposed to the inner peripheral side surface 65 in the radial direction A with an annular clearance 131, the outer projecting portion 92 includes a cylindrical inner peripheral side surface 133 connected continuously to the upper surface 116 and forming an annular recess 132 in cooperation with the upper surface 116 and the outer peripheral side surface 121, and an annular upper end surface 135 connected continuously to the outer peripheral side surface 93 and the inner peripheral side surface 133 in such a manner as to be flush with the upper end surface 123 and opposed to the lower surface 21 in the vertical direction B with an annular clearance 134.

In addition to the inner peripheral side surface 95 opposing the outer peripheral side surface 31 in the radial direction A with an annular clearance 141, the engaging projecting portion 96 includes an annular upper end surface 143 connected continuously to the inner peripheral side surface 95 in such a manner as to be flush with the upper end surfaces 123 and 135 and opposed to the lower surface 21 in the vertical direction B with an annular clearance 142, and an outer bulged engaging surface 145 connected continuously at an upper edge thereof to the upper end surface 143 and at a lower edge thereof to the outer peripheral side surface 115, respectively, and opposed to the truncated conical surface 73 and the inner bulged engaging surface 74 in the radial direction A with a clearance 144. The outer bulged engaging surface 145 has a maximum diameter which is greater than a minimum diameter of the inner bulged engaging surface 74. By virtue of such a relationship between the maximum diameter of the outer bulged engaging surface 145 and the minimum diameter of the inner bulged engaging surface 74, the upper casing inner suspended portion 27 is fitted over the lower casing inner suspended portion 82 with the fitting clearance 4 between the suspended outer peripheral side surface 26 and the suspended inner peripheral side surface 81 in the radial direction A through snap-fit type resilient engagement between the lower casing 6 and the upper casing 3, i.e., between the engaging suspended portion 34 and the engaging projecting portion 96 at the inner bulged engaging surface 74 and the outer bulged engaging surface 145, thereby allowing the upper casing 3 to be mounted on and combined with the lower casing 6. Meanwhile, engagement of the outer bulged engaging surface 145 with the inner bulged engaging surface 74 occurs in the relative movement of the lower casing 6 away from the upper casing 3 in the vertical direction B, so that complete separation of the lower casing 6 from the upper casing 3 is prevented. More specifically, the fall-off of the lower casing 6 from the upper casing 3 is prevented, thereby allowing the combination of the lower casing 6 and the upper casing 3 to be maintained.

In such a combination between the upper casing 3 and the lower casing 6, the outer suspended portion 30 is disposed in the lower outer groove 94 with the clearance 131 in the radial direction A between the inner peripheral side surface 65 thereof and the outer peripheral side surface 93 of the outer projecting portion 92 facing each other in the radial direction A and with the clearance 141 in the radial direction A between the outer peripheral side surface 31 thereof and the inner peripheral side surface 95 of the engaging projecting portion 96 facing each other in the radial direction A, while the engaging projecting portion 96 is disposed in the upper outer groove 32 with the clearance 144 in the radial direction A between the outer bulged engaging surface 145 as the outer peripheral side surface thereof and the inner peripheral side surface 33 of the engaging suspended portion 34 facing each other in the radial direction A.

The annular thrust sliding bearing 9, which is formed separately from the upper casing 3 and the lower casing 6, includes an inner peripheral side surface 152 defining a central circular hole 151 and having a diameter greater than the diameter of the outer peripheral side surface 121; an outer peripheral side surface 153 having a diameter smaller than the diameter of the inner peripheral side surface 133; an annular upper surface 154 serving as an upper annular thrust sliding bearing surface in the vertical direction B; and an annular lower surface 155 serving as a lower annular thrust sliding bearing surface in the vertical direction B. The thrust sliding bearing 9 is disposed in the recess 132 with annular clearances between the inner peripheral side surface 152 and the outer peripheral side surface 121 and between the outer peripheral side surface 153 and the inner peripheral side surface 133 such that the annular upper surface 154 is positioned higher than an opening plane 156 of the recess 132. Thus, the thrust sliding bearing 9 is disposed in the recess 132 in the annular space 7 between the upper casing 3 and the lower casing 6, such that the upper surface 154 is brought slidably in a circumferential direction R into contact with the lower surface 21 of the upper plate portion 23 of the upper casing 3 mounted on the lower casing 6, while the lower surface 155 is brought slidably in the circumferential direction R into contact with the upper surface 116 of the lower plate portion 89 defining the bottom surface of the recess 132.

The thrust sliding bearing 9, whose upper surface 154 is in slidable contact with the lower surface 21 of the upper plate portion 23 and whose lower surface 155 is in slidable contact with the upper surface 116 of the lower plate portion 89, further includes annular grooves 161 formed in the upper surface 154 and the lower surface 155 in such a manner as to surround the circular hole 151 and a plurality of radial grooves 162 whose one ends are open at the annular groove 161 and other ends are open at the outer peripheral side surface 153, and which are arranged at equal intervals in the circumferential direction R. A lubricant such as grease is filled in these annular grooves 161 and radial grooves 162.

The synthetic resin-made sliding bearing 1 is formed as the upper casing 3 is mounted on the lower casing 6 through the fitting of the engaging suspended portion 34 with the engaging projecting portion 96 on the basis of flexural deformation for overcoming the diametrical difference, by means of an outer peripheral side clearance 171 which is constituted by the space between mutually opposing surfaces of the upper casing 3 and the lower casing 6 and allows the outer peripheral portion in the radial direction A of the annular space 7 located between the lower surface 21 and the upper surface 86 to communicate with the outside of the synthetic resin-made sliding bearing 1, i.e., the outside of an interposed space between the upper casing 3 and the lower casing 6, by means of an inner peripheral side clearance 172 which is constituted by the space between mutually opposing surfaces of the upper casing 3 and the lower casing 6 and allows the inner peripheral portion in the radial direction A of the annular space 7 to communicate with the outside of the synthetic resin-made sliding bearing 1 through the fitting clearance 4, and by means of the fitting clearance 4 having the width a. Specifically, the clearance 171 includes the annular clearance 134 communicating with a radially outer peripheral portion of the annular space 7 and constituted by the space between the mutually opposing lower surface 21 and upper end surface 135; the clearance 131 communicating with the annular clearance 134 and constituted by the space between the mutually opposing inner peripheral side surface 65 and outer peripheral side surface 93; the annular clearance 120 communicating with the clearance 131 and constituted by the space between the mutually opposing lower surface 66 and upper surface 118; the clearance 141 communicating with the annular clearance 120 and constituted by the space between the mutually opposing outer peripheral side surface 31 and inner peripheral side surface 95; the annular clearance 142 communicating with the clearance 141 and constituted by the space between the mutually opposing lower surface 21 and upper end surface 143; and the clearance 144 communicating with the annular clearance 142 and constituted by the space between the mutually opposing inner peripheral side surface 33 and outer bulged engaging surface 145. Meanwhile, the clearance 172 includes the annular clearance 122 which communicates, on the one hand, with the radially inner peripheral portion of the annular space 7 and, on the other hand, with the fitting clearance 4 and constituted by the space between the mutually opposing lower surface 21 and upper end surface 123; the clearance 100 communicating with the fitting clearance 4 and constituted by the space between the mutually opposing lower end surface 62 and upper surface 84; the lower end outer clearance 106 communicating with the clearance 100 and constituted by the space between the mutually opposing inner peripheral side surface 63 and outer peripheral side surface 107; and the clearance 104 communicating with the lower end outer clearance 106 and constituted by the space between the mutually opposing lower end surface 28 and upper end surface 105.

In such a synthetic resin-made sliding bearing 1, each of the clearances 131, 141, and 144 and the lower end outer clearance 106 which extend in such a manner as to intersect the radial direction A in the clearance 171 and the clearance 172 has a width in the radial direction A which is equal to or greater than the minimum width a in the radial direction A of the fitting clearance 4.

Figure 5:
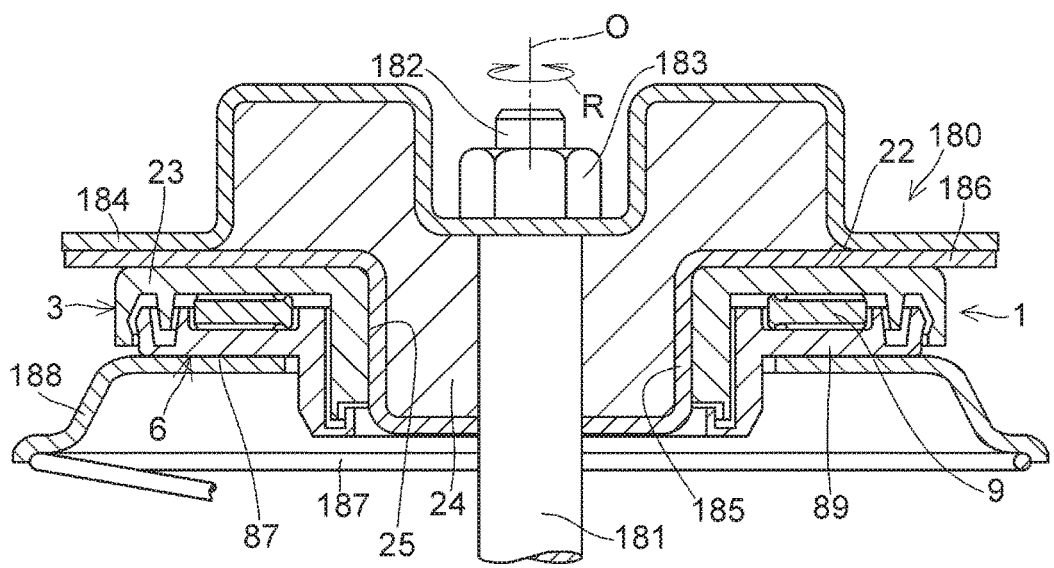
FIG. 5 is an explanatory cross-sectional view in which the embodiment shown in FIG. 1 is incorporated in a strut-type suspension.

In a strut assembly 180 shown in FIG. 5, the above-described synthetic resin-made sliding bearing 1 is disposed between a vehicle body-side mounting member 184 and an upper spring seat 188 as a hollow cylindrical portion 185 of the vehicle body-side mounting member 184, which is mounted through a nut 183 or the like on one end portion 182 of a piston rod 181 serving as a shaft, is fitted into the through hole 24 in close contact with the inner peripheral side surface 25 without a gap, such that a flat plate portion 186 of the vehicle body-side mounting member 184 is brought into close contact with the upper surface 22 of the upper plate portion 23 without a gap, and the upper spring seat 188 receiving one end of a coil spring 187 is brought into close contact with the lower surface 87 of the lower plate portion 89 without a gap.

With the above-described synthetic resin-made sliding bearing 1, which is disposed between the vehicle body-side mounting member 184 and the upper spring seat 188 and in which the upper casing 3 at the inner peripheral side surface 45 defining the through hole 24 is immovably fixed in the radial direction A to the piston rod 181 which is passed through the through holes 24 and 112, since the thrust sliding bearing 9 is interposed between the lower casing 6 and the upper casing 3 mounted on the lower casing 6, the rotation in the circumferential direction R, i.e., the rotating direction about an axis O, of the upper spring seat 188 with respect to the vehicle body-side mounting member 184 in the steering operation is effected through at least one of the rotational sliding in the circumferential direction R of the thrust sliding bearing 9 at the upper surface 154 thereof with respect to the lower surface 21 and the rotational sliding in the circumferential direction R of the thrust sliding bearing 9 at the lower surface 155 thereof with respect to the upper surface 116. As a result, smooth steering operation can be obtained. Moreover, since each of the clearances 131, 141, and 144 and the lower end outer clearance 106 which extend in such a manner as to intersect the radial direction A in the clearance 171 and the clearance 172 has a width in the radial direction A which is equal to or greater than the minimum width a in the radial direction A of the fitting clearance 4, even if a radial relative displacement of at most the width a occurs to the lower casing 6 with respect to the upper casing 3, it is possible to avoid each interference ascribable to the mutual pressing and contacting in the radial direction A between the inner peripheral side surface 65 and the outer peripheral side surface 93, the mutual pressing and contacting in the radial direction A between the outer peripheral side surface 31 and the inner peripheral side surface 95, the mutual pressing and contacting in the radial direction A between the inner peripheral side surface 33 and the outer bulged engaging surface 145, and the mutual pressing and contacting in the radial direction A between the inner peripheral side surface 63 and the outer peripheral side surface 107. As a result, even if such a radial relative displacement of at most the width a in the radial direction A occurs to the lower casing 6 with respect to the upper casing 3, defects such as deformation, damage, and breakage are not caused in the lower end outer suspended portion 29, the outer suspended portion 30, the engaging suspended portion 34, the lower end projecting portion 85, the outer projecting portion 92, and the engaging projecting portion 96. Moreover, an increase in frictional resistance ascribable to such interference does not occur in the relative rotation in the circumferential direction R of the lower casing 6 with respect to the upper casing 3, thereby making it possible to maintain smooth steering operation.

Namely, with the synthetic resin-made sliding bearing 1, it is possible to avoid the pressing and contacting in the radial direction A between the lower end outer suspended portion 29 and the lower end projecting portion 85, the pressing and contacting in the radial direction A between, on the one hand, the outer suspended portion 30 and, on the other hand, the outer projecting portion 92 and the engaging projecting portion 96, and the pressing and contacting in the radial direction A between the engaging suspended portion 34 and the engaging projecting portion 96, which are ascribable to the width a required for insertion to fit and superpose the upper casing 3 on the lower casing 6, so that smooth steering operation can be ensured.

Figure 6:
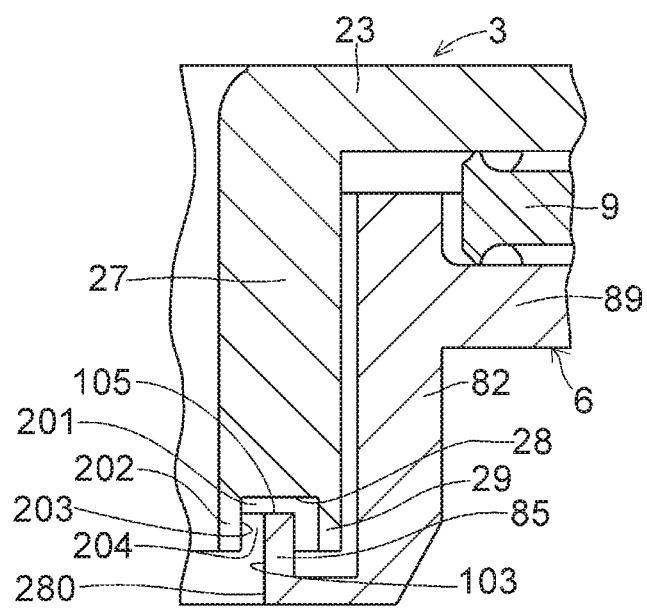
FIG. 6 is an explanatory partial cross-sectional view of another preferred embodiment of the invention.

Incidentally, as shown in FIG. 6, the synthetic resin-made sliding bearing 1 may be comprised of the upper casing 3 which further has a cylindrical lower end inner suspended portion 202 provided on the inner side in the radial direction A of the lower end surface 28 so as to form an annular groove 201 in cooperation with the lower end outer suspended portion 29. In this case, the lower end projecting portion 85 may be disposed in the annular groove 201 such that the inner peripheral side surface 103 thereof is opposed to a cylindrical outer peripheral side surface 203 of the lower end inner suspended portion 202 in the radial direction A with a lower end inner clearance 204. The lower end inner clearance 204, which forms the inner peripheral side clearance 172 for allowing the inner peripheral portion in the radial direction A of the annular space 7 to communicate with the outside of the synthetic resin-made sliding bearing 1 and extends in such a manner as to intersect the radial direction A, also has a width in the radial direction A which is equal to or greater than the minimum width a in the radial direction A of the fitting clearance 4.

With the synthetic resin-made sliding bearing 1 shown in FIG. 6 as well, since the lower end inner clearance 204 also has a width in the radial direction A which is equal to or greater than the minimum width a in the radial direction A of the fitting clearance 4, it is possible to avoid the pressing and contacting in the radial direction A between the lower end inner suspended portion 202 and the lower end projecting portion 85, so that smooth steering operation can be ensured.

In the synthetic resin-made sliding bearing 1 shown in FIGS. 1 to 4 or FIG. 6, the inner projecting portion 91 may have the inner peripheral side surface 90 with a greater diameter than that of the inner peripheral side surface 88. Furthermore, the radially inner peripheral portion of the annular space 7 may be made to communicate directly with the outside of the synthetic resin-made sliding bearing 1 with the fitting clearance 4 without providing the lower end outer suspended portion 29, the lower end plate portion 83, and the lower end projecting portion 85. Additionally, the lower end inner suspended portion 202 and the lower end plate portion 83 may be formed such that, without providing the lower end outer suspended portion 29 and the lower end projecting portion 85, the lower end plate portion 83 at the cylindrical inner peripheral side surface 280 thereof is opposed to the outer peripheral side surface 203 of the lower end inner suspended portion 202 in the radial direction A with the lower end inner clearance 204, and such a lower end inner clearance 204 is provided with a radial width which is equal to or greater than the minimum width a in the radial direction A of the fitting clearance 4.

In addition, in the above-described embodiments, the outer peripheral side surface 2 includes the cylindrical suspended outer peripheral side surface 26 and outer peripheral side surface 61 which are identical in diameter and are concentric with each other, and the inner peripheral side surface 5 disposed concentrically with such an outer peripheral side surface 2 includes the cylindrical suspended inner peripheral side surface 81, inner peripheral side surface 88, and inner peripheral side surface 90 which are similarly identical in diameter and are concentric with each other. Therefore, the width a as the minimum width in the radial direction A of the fitting clearance 4 is ½ of the difference between the diameter of the inner peripheral side surface 5 which is also the diameter of each of the suspended inner peripheral side surface 81, the inner peripheral side surface 88, and the inner peripheral side surface 90 and the diameter of the outer peripheral side surface 2 which is also the diameter of each of the suspended outer peripheral side surface 26 and the outer peripheral side surface 61. However, in a case where, for example, the outer peripheral side surface 2 disposed concentrically with the inner peripheral side surface 5 includes the cylindrical suspended outer peripheral side surface 26 and outer peripheral side surface 61 which are identical in diameter and are concentric with each other in the same way as described above, and yet the inner peripheral side surface 5 includes the cylindrical suspended inner peripheral side surface 81, inner peripheral side surface 88, and inner peripheral side surface 90 which have mutually different diameters and are concentric with each other, the width a as the minimum width in the radial direction A of the fitting clearance 4 is ½ of the difference between a minimum diameter among the diameters of the suspended inner peripheral side surface 81, inner peripheral side surface 88, and inner peripheral side surface 90 and the diameter of the outer peripheral side surface 2. The same applies to other cases, and therefore, in the present invention, the minimum width in the radial direction A of the fitting clearance 4 means ½ of the difference between a minimum diameter in the inner peripheral side surface 5 and a maximum diameter of the outer peripheral side surface 2, and the lower casing 6 is provided with the upper casing 3 mounted thereon as the upper casing 3 is fitted thereto such that the displacement of the lower casing 6 in the radial direction A with respect to the upper casing 3 is possible with such a minimum width in the radial direction A of the fitting clearance 4.

DESCRIPTION OF REFERENCE NUMERALS

1: synthetic resin-made sliding bearing
2: outer peripheral side surface
3: upper casing
4: fitting clearance
5: inner peripheral side surface
6: lower casing
7: annular space
9: thrust sliding bearing

The invention claimed is:
1. A synthetic resin-made sliding bearing comprising:
a synthetic resin-made upper casing having a cylindrical outer peripheral side surface;
a synthetic resin-made lower casing which has a cylindrical inner peripheral side surface opposed to the outer peripheral side surface of said upper casing in a radial direction so as to surround the outer peripheral side surface of said upper casing with a cylindrical fitting clearance extending to intersect the radial direction, and on which said upper casing is mounted as said upper casing is fitted thereto such that a radial displacement of said lower casing with respect to said upper casing is made possible with a radial minimum width of the fitting clearance by being restricted by the contact of the inner peripheral side surface with the outer peripheral side surface of said upper casing; and
a synthetic resin-made thrust sliding bearing disposed in an annular space between said upper casing and said lower casing in a vertical direction,
in an outer peripheral side clearance allowing a radially outer peripheral portion of the annular space to communicate with an outside of the synthetic resin-made sliding bearing and constituted by mutually opposing surfaces of said upper casing and said lower casing and an inner peripheral side clearance allowing a radially inner peripheral portion of the annular space to communicate with the outside of the synthetic resin-made sliding bearing through the fitting clearance and constituted by mutually opposing surfaces of said upper casing and said lower casing, a clearance extending to intersect the radial direction having a radial width which is equal to or greater than the radial minimum width of the fitting clearance.

2. The synthetic resin-made sliding bearing according to claim 1, wherein said upper casing has a cylindrical upper casing inner suspended portion provided on a radially inner side and having a cylindrical suspended outer peripheral side surface, and said lower casing has a cylindrical lower casing inner suspended portion provided on the radially inner side and having a cylindrical suspended inner peripheral side surface radially opposing the suspended outer peripheral side surface, and wherein the outer peripheral side surface of said upper casing includes the suspended outer peripheral side surface, and the inner peripheral side surface of said lower casing includes the suspended inner peripheral side surface, said upper casing being mounted on said lower casing as the upper casing inner suspended portion is fitted to the lower casing inner suspended portion with the fitting clearance between the suspended outer peripheral side surface and the suspended inner peripheral side surface in the radial direction.

3. The synthetic resin-made sliding bearing according to claim 2, wherein said upper casing has a cylindrical lower end outer suspended portion provided on a radially outer side of a lower end surface of the upper casing inner suspended portion, and said lower casing has an annular lower end plate portion provided on a lower end of the suspended inner peripheral side surface of the lower casing inner suspended portion and a lower end projecting portion provided on an upper surface of the lower end plate portion, the lower end projecting portion at a cylindrical outer peripheral side surface thereof being opposed in the radial direction to a cylindrical inner peripheral side surface of the lower end outer suspended portion with a lower end outer clearance, and wherein the lower end outer clearance which forms the inner peripheral side clearance for allowing the radially inner peripheral portion of the annular space to communicate with the outside of the synthetic resin-made sliding bearing and extends to intersect the radial direction has a radial width which is equal to or greater than the radial minimum width of the fitting clearance.

4. The synthetic resin-made sliding bearing according to claim 3, wherein said upper casing further has a cylindrical lower end inner suspended portion provided on the radially inner side of the lower end surface of the upper casing inner suspended portion so as to form an annular groove in cooperation with the lower end outer suspended portion, and the lower end projecting portion is disposed in the annular groove such that a cylindrical inner peripheral side surface thereof is opposed in the radial direction to a cylindrical outer peripheral side surface of the lower end inner suspended portion with a lower end inner clearance, and wherein the lower end inner clearance which forms the inner peripheral side clearance for allowing the radially inner peripheral portion of the annular space to communicate with the outside of the synthetic resin-made sliding bearing and extends to intersect the radial direction has a radial width which is equal to or greater than the radial minimum width of the fitting clearance.

5. The synthetic resin-made sliding bearing according to claim 2, wherein said upper casing has a cylindrical lower end inner suspended portion provided on a radially inner side of the lower end surface of the upper casing inner suspended portion, and said lower casing has an annular lower end plate portion provided on a lower end of the suspended inner peripheral side surface of the lower casing inner suspended portion, the lower end plate portion at a cylindrical inner peripheral side surface thereof being opposed in the radial direction to a cylindrical outer peripheral side surface of the lower end inner suspended portion with a lower end inner clearance, and wherein the lower end inner clearance which forms the inner peripheral side clearance for allowing the radially inner peripheral portion of the annular space to communicate with the outside of the synthetic resin-made sliding bearing and extends to intersect the radial direction has a radial width which is equal to or greater than the radial minimum width of the fitting clearance.

6. The synthetic resin-made sliding bearing according to claim 2, wherein said upper casing has an annular upper plate portion having a lower surface, said lower casing has an annular lower plate portion having an upper surface and a cylindrical inner peripheral side surface flush with the cylindrical suspended inner peripheral side surface of the lower casing inner suspended portion, and the inner peripheral side surface of said lower casing includes the inner peripheral side surface of the lower plate portion, and wherein said thrust sliding bearing has an upper surface which is brought into slidable contact with the lower surface of the upper plate portion and a lower surface which is brought into slidable contact with the upper surface of the lower plate portion, and the annular space is located between the lower surface of the upper plate portion and the upper surface of the lower plate portion.

7. The synthetic resin-made sliding bearing according to claim 6, wherein said lower casing further has a cylindrical inner projecting portion provided on the radially inner side and having a cylindrical inner peripheral side surface flush with the cylindrical inner peripheral side surface of the lower plate portion or of a greater diameter than the inner peripheral side surface of the lower plate portion, and the inner peripheral side surface of said lower casing includes the cylindrical inner peripheral side surface of the inner projecting portion.

8. The synthetic resin-made sliding bearing according to claim 1, wherein said upper casing further has a through hole located in a center thereof in the radial direction and an inner peripheral side surface defining the through hole, and said upper casing at the inner peripheral side surface thereof defining the through hole is immovably fixed in the radial direction to a shaft which is passed through the through hole.

9. The synthetic resin-made sliding bearing according to claim 1, wherein said upper casing includes a cylindrical outer suspended portion provided on a radially outer side and a cylindrical engaging suspended portion having an inner peripheral side surface for forming an annular upper outer groove in cooperation with an outer peripheral side surface of the outer suspended portion and provided radially outwardly of the outer suspended portion, wherein said lower casing includes a cylindrical outer projecting portion provided on the radially outer side and a cylindrical engaging projecting portion having an inner peripheral side surface for forming an annular lower outer groove in cooperation with an outer peripheral side surface of the outer projecting portion and provided radially outwardly of the outer projecting portion, the outer suspended portion being disposed in the lower outer groove with a radial first clearance between an inner peripheral side surface thereof and the outer peripheral side surface of the outer projecting portion which are opposed to each other in the radial direction and with a radial second clearance between the outer peripheral side surface thereof and an inner peripheral side surface of the engaging projecting portion which are opposed to each other in the radial direction,
the engaging projecting portion being disposed in the upper outer groove with a radial third clearance between an outer peripheral side surface thereof and the inner peripheral side surface of the engaging suspended portion which are opposed to each other, and
wherein each of the first to third clearances forming the outer peripheral side clearance allowing the radially outer peripheral portion of the annular space to communicate with the outside of the synthetic resin-made sliding bearing and extending to intersect the radial direction has a radial width which is equal to or greater than the radial minimum width of the fitting clearance.

* * * * *